United States Patent
Wainberg et al.

[11] Patent Number: 5,934,344
[45] Date of Patent: Aug. 10, 1999

[54] PRINTING INK STORAGE CONTAINER AND ASSOCIATED DISPENSING APPARATUS

[75] Inventors: Peter Wainberg, Hampstead; Arnold Lipes, Westmount, both of Canada

[73] Assignee: Pemla Technologies Inc., Montreal, Canada

[21] Appl. No.: 08/997,884

[22] Filed: Dec. 24, 1997

[51] Int. Cl.⁶ ..................................................... B65B 1/30
[52] U.S. Cl. ................................. 141/83; 141/64; 141/67; 141/100; 141/103; 141/104; 141/241; 222/160; 222/164; 222/167; 222/212; 222/214; 222/389
[58] Field of Search .................................. 141/4, 67, 83, 141/100, 102, 103, 241, 319, 27, 64, 104; 222/144.5, 160, 164, 167, 212, 214, 389, 394; 128/200.21, 200.22, 203.21

[56] References Cited

U.S. PATENT DOCUMENTS

| | | | |
|---|---|---|---|
| 3,367,545 | 2/1968 | Cook | 222/389 |
| 4,385,714 | 5/1983 | Szabo et al. | 222/389 |
| 4,585,148 | 4/1986 | Ito | 222/144.5 |
| 4,961,508 | 10/1990 | Weimer et al. | 222/212 |
| 5,115,842 | 5/1992 | Crafts et al. | 141/319 |
| 5,301,838 | 4/1994 | Schmidt et al. | 222/389 |
| 5,402,913 | 4/1995 | Graf | 222/214 |
| 5,474,211 | 12/1995 | Hellenberg | 222/1 |
| 5,558,251 | 9/1996 | Neri | 222/135 |

*Primary Examiner*—Henry J. Recla
*Assistant Examiner*—Timothy L. Maust
*Attorney, Agent, or Firm*—Marvin S. Towsend

[57] ABSTRACT

An ink dispensing apparatus is comprised of a support frame capable of supporting a plurality of ink containers. The apparatus is provided with an agitating mechanism to agitate the containers from time-to-time to maintain the ink and coloring agent therein in admixture and substantially homogeneous, particularly before dispensing ink. Pressure is applied to the ink container to assist in the discharge of ink from a flexible dispensing spout which is connected to the mouth opening of each container. A scale is displaceable under each container and on which a vessel is supported for receiving a desired weight quantity of ink from selected ones of the containers which contain inks of different colors. The ink is dispensed by operating a hand-operable dispensing valve mechanism which closes and opens the flexible tube in a regulated manner.

16 Claims, 3 Drawing Sheets

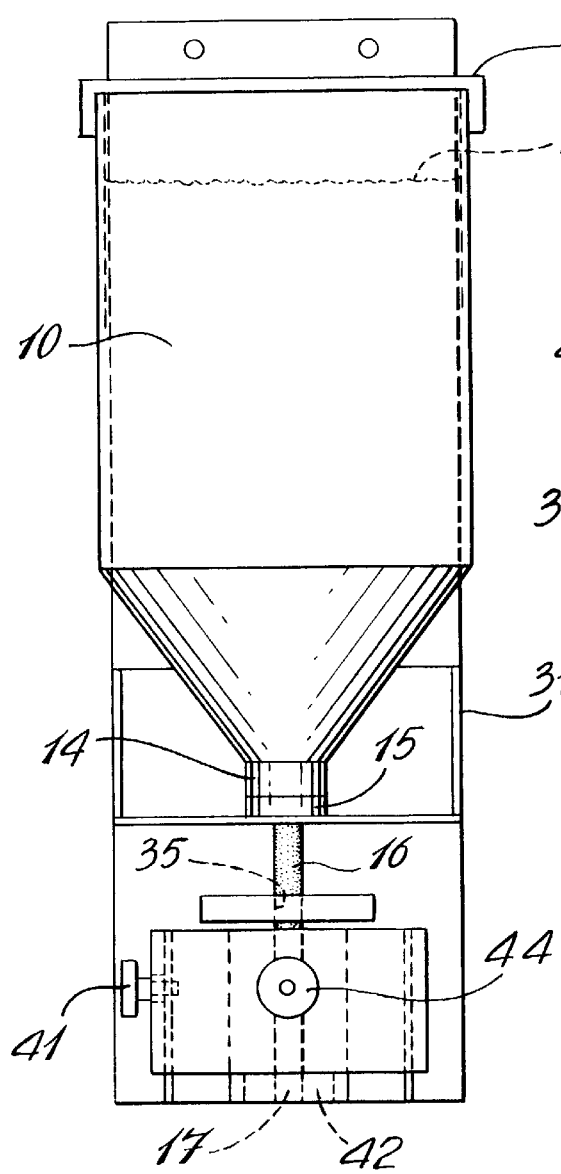
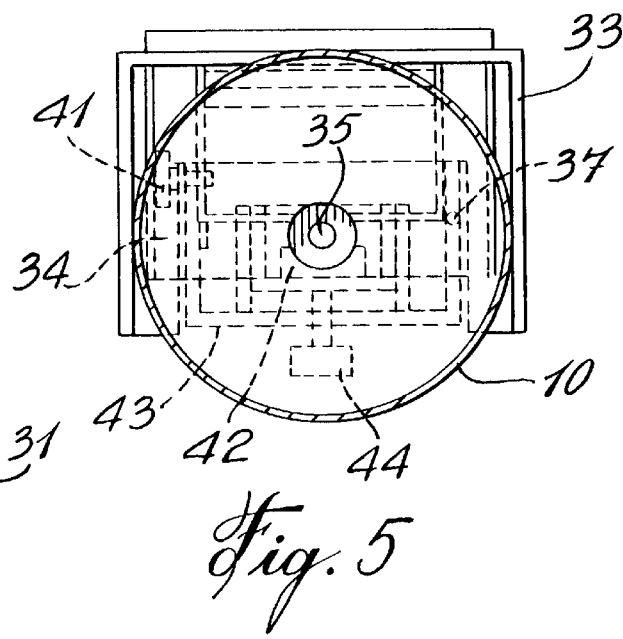
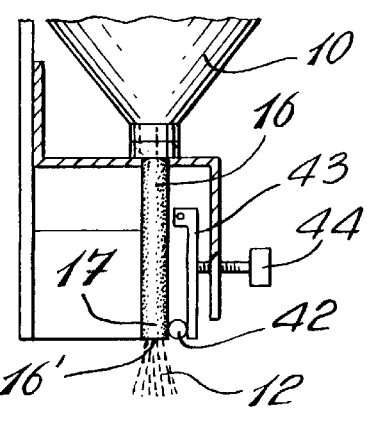
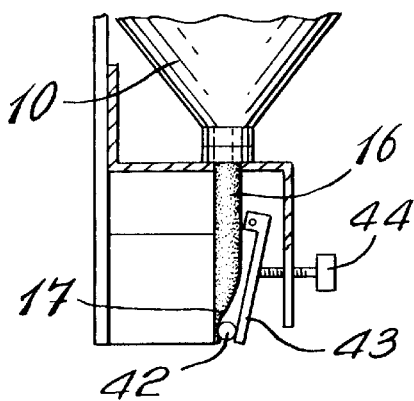
Fig. 4
Fig. 5
Fig. 6A
Fig. 6B

PRINTING INK STORAGE CONTAINER AND ASSOCIATED DISPENSING APPARATUS

TECHNICAL FIELD

The present invention relates to a liquid printing ink storage container and associated dispensing apparatus for dispensing predetermined desired weight quantities of ink contained in a plurality of containers each having an ink of a different color.

BACKGROUND ART

Apparatuses are known for dispensing various paint colours and the like in predetermined volumes into a paint container whereby to produce a desired color paint. Such apparatuses are, for example, described in U.S. Pat. Nos. 5,474,211 and 5,558,251. Containers containing different color paints are mounted on a turn table with each of the containers being identified. The desired containers are then rotated to position same at a discharge location where a predetermined quantity of paint is discharged through a metering valve apparatus. A metering pump is usually provided at the dispensing station and by controlling a discharge cycle a certain volume of paint is released. A disadvantage of this type of equipment is that it is very costly to fabricate and requires frequent maintenance as the valves and discharge port are of complex construction and this causes small paint residue to lodge itself in irregular spaces where it hardens as it is usually maintained stagnant for long periods of time between uses. Also, these paints are most often contained in containers which are maintained stationary and the heavier paint molecules settle to the bottom of the paint mixture and therefore the composition of the mixture may vary between uses.

When dispensing colored liquid printing ink from containers for commercial use, it is desirable to maintain the ink and its coloring agent in a substantially homogeneous condition. This is particularly so as the coloring agent has a specific gravity greater than that of water and has a tendency of settling to the bottom of the container. Also, every color has its own chemistry and the specific gravity of the various chemicals differ between different colors. Another problem with prior art devices is that there is a requirement to fill the containers in the dispensing machine with pigments which are transported in another container, usually metal containers. Accordingly, it is firstly necessary to mix the coloring agent within the transport container and then place the mixed color into designated ones of the containers permanently secured in the machine. If the ink is not stirred properly then the composition thereof will vary as the machine containers are filled from time-to-time. This is also expensive in that additional transport containers need to be provided.

Containers of the prior art are usually metal containers and many are reusable. Accordingly, they require cleaning.

SUMMARY OF INVENTION

It is a feature of the present invention to provide an ink storage container as well as an associated dispensing apparatus which substantially overcomes the above-mentioned disadvantages of the prior art.

Another feature of the present invention is to provide an ink storage container which is used for the storage, transport and dispensing of an ink contained therein.

Another feature of the present invention is to provide a novel disposable plastic ink storage container having a dispensing spout at a discharge end of the container and a nipple at an opposite end whereby air under pressure is admitted through the nipple when the container is fitted in an ink dispensing apparatus.

A still further feature of the present invention is to provide an ink dispensing apparatus capable of holding a plurality of ink storage containers, each having a different ink color and wherein the ink and coloring agent within the containers may be agitated within the apparatus in a manner as to maintain a substantially homogeneous ink mixture within the container.

Another feature of the present invention is to provide an ink dispensing apparatus which is inexpensive to fabricate and wherein a hand-operable valve is associated with each of the containers to dispense a regulated weight quantity of ink from the containers.

Another feature of the present invention is to provide an ink dispensing apparatus and wherein the contents of each of the containers is maintained under pressure to assist the discharge of ink therefrom.

Another feature of the present invention is to provide an ink dispensing apparatus which is easy to operate and which provides for accurate dispensing of ink from selected ones of a plurality of containers.

According to the above features, from a broad aspect, the present invention provides an ink dispensing apparatus which comprises a support frame for supporting a plurality of ink containers having an ink with a coloring agent therein. Means is provided to agitate the containers to maintain the ink in admixture with the coloring agent. Pressure control means is provided to apply a predetermined pressure in the containers to assist in the discharge of ink therefrom. A scale is provided for weighing ink discharged from selected ones of the containers. A dispensing valve mechanism is associated with a respective one of the containers. The valve mechanism maintains a flexible dispensing tube connected at a dispensing end of each of the containers in a closed condition and capable of dispensing a desired weight quantity of the ink from the tube of selected ones of the containers.

According to another broad aspect of the present invention there is provided an ink container for the storage, transport and dispensing of an ink contained therein. The container has a mouth opening at a top end of a neck portion thereof. A cap is secured to the mouth opening. A flexible dispensing tube is sealingly secured to the cap. Connector means is provided in a bottom wall of the container and is adapted to secure an air pressure line thereto.

According to another broad aspect of the present invention the ink storage container is a disposable plastic container.

BRIEF DESCRIPTION OF DRAWINGS

A preferred embodiment of the present invention will now be described with reference to the examples thereof as illustrated in the accompanying drawings in which:

FIG. 4 is a front view of FIG. 3;

FIG. 5 is a computer-generated top view of FIG. 4 with the container having been removed;

FIGS. 6A and 6B are schematic side views showing the hand-operable dispensing valve mechanism in a fully open and fully closed position;

DESCRIPTION OF PREFERRED EMBODIMENTS

Figure 1:
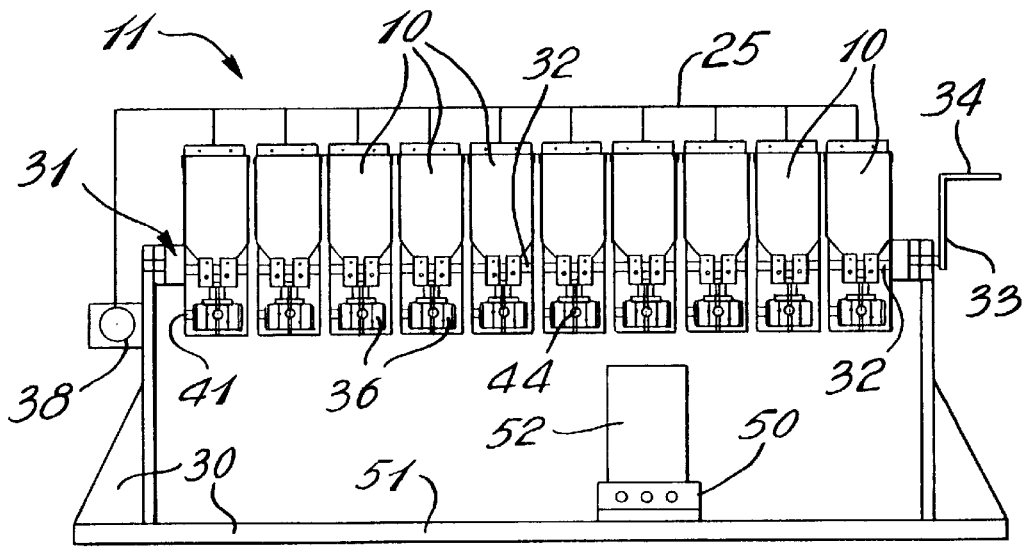
FIG. 1 is a simplified front view illustrating the construction of the basic component parts of the ink dispensing apparatus of the present invention and herein provided with a plurality of ink containers of the present invention secured therein.
Figure 7:
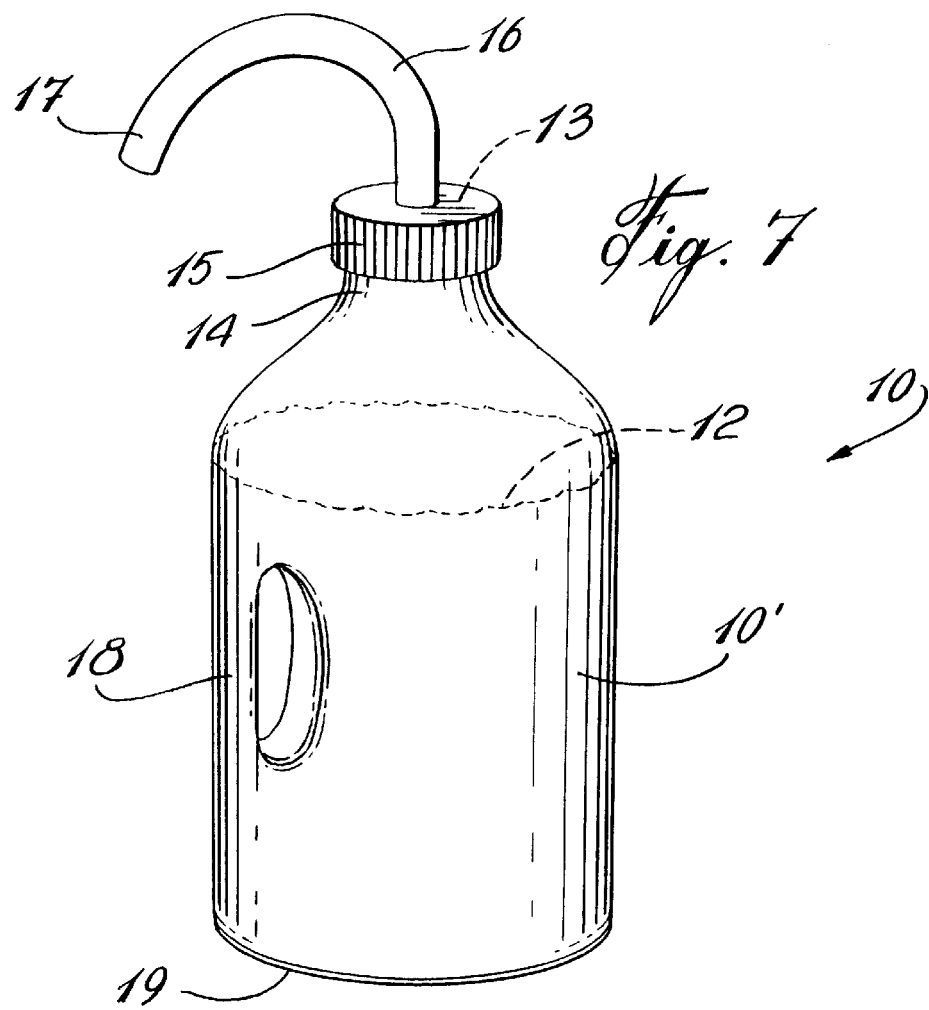
FIG. 7 is a perspective view of an ink storage container constructed in accordance with the present invention.
Figure 8:
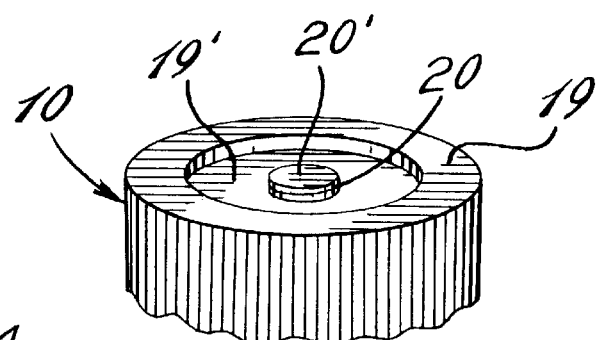
FIG. 8 is a fragmented perspective view showing the bottom wall of the container of FIG. 7.
Figure 9:
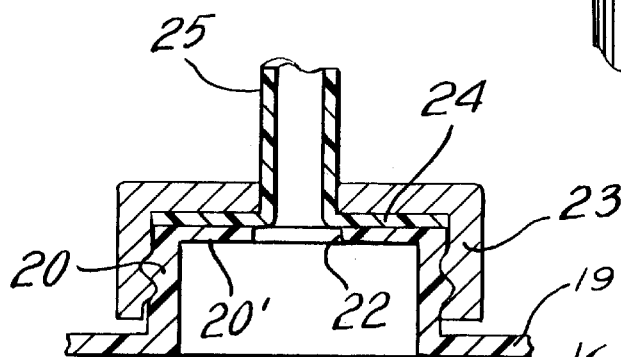
FIG. 9 is a fragmented section view illustrating the air pressure line coupling to the connector nipple provided in the recessed bottom wall as illustrated in FIG. 8.

Before describing the apparatus as illustrated in FIGS. 1 to 6, reference is made to FIGS. 7 to 9 which illustrate the construction of an ink container 10 fabricated for use with the apparatus 11 as illustrated in FIG. 1. The container 10 is preferably, although not exclusively, a disposable container fabricated from plastics material and capable of containing therein a water base ink 12 in which a coloring agent is added in admixture with other ingredients to form a specific ink color. The ink could also be a solvent and/or UV based system. The container 10 has a mouth opening 13 provided at the top end of a neck portion 14 thereof and a cap 15 is secured to a circumferential thread disposed about the top part of the neck portion 14. A flexible dispensing tube 16 having a free end 17 is sealingly secured to the cap 15. A handle 18 may be molded in the side wall 10' of the container 10 to facilitate transport thereof. The cap 15 with the tube 16 is fitted on the container when positioning the container in the apparatus 11. For transport a normal sealed cap is used.

As shown in FIG. 8, the bottom wall 19 of the container 10 is provided with a connector means in the form of a threaded nipple 20 which projects in a recessed cavity 19' formed in the bottom wall 19. The threaded nipple has a sealed top wall 20' which is adapted to be punctured to adapt a connector thereto for connecting a pressurized airline thereto, as will be described later, whereby to apply pressure in the container to create a pressurized dispensing flow of ink through the dispensing tube 16 as will be later described. Accordingly, the container may be disposed to sit on its bottom wall 19 due to the recessed nipple 20. The bottom wall 19 may also be shaped to be retained captive in the apparatus 11.

As shown in FIG. 9, a hole 22 is formed in the sealed top wall 20' of the nipple 20 and a connector cap 23 having a sealing washer 24 is threaded about the threaded nipple 20. A pressure line or hose 25 is sealed with the washer 24 within the connector cap 23. Accordingly, the container 10 can be pressurized as will be described later.

Figures 2, 3:
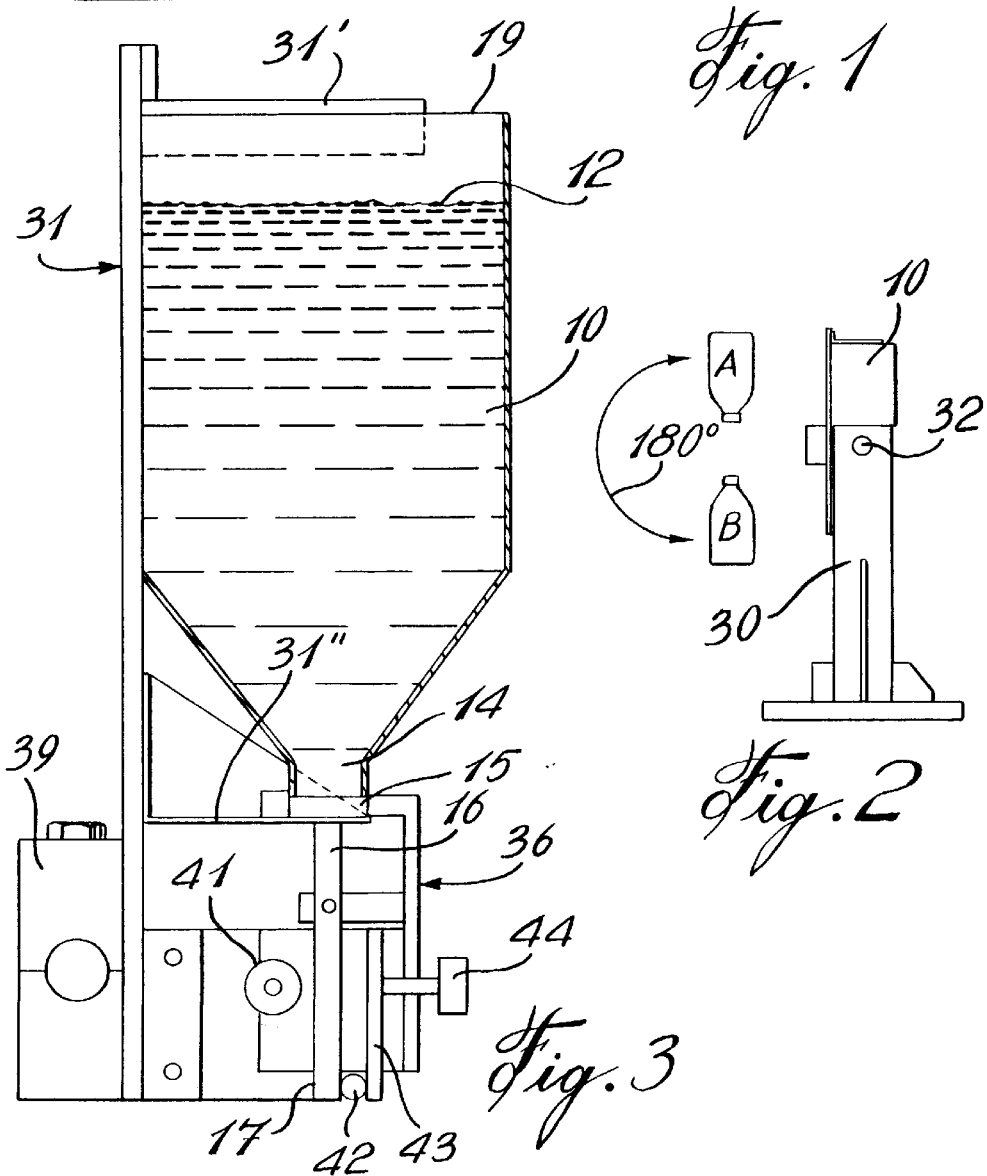
FIG. 2 is a simplified schematic side view of the apparatus of FIG. 1 and showing the position of the ink container when at a dispensing position and its arcuate displacement for the agitation of the ink contained therein.
FIG. 3 is a side view showing the construction of the container support frame as well as the hand-operable dispensing valve mechanism.

Referring now to FIGS. 1 to 6, there is shown generally at 11 the ink dispensing apparatus of the present invention and it consists of a main frame 30 capable of supporting a container support frame 31 at an elevated position and on an axially rotatable support shaft 32. The rotatable shaft 32 is axially displaceable by a crank lever 33 having a handle 34 capable of displacing the containers 10 from an ink discharge position A, as shown in FIG. 2, and within an arc of 180° to an inverted position B. By imparting reciprocating motion on the handle 34 the container 10 will be reciprocated between positions A and B to agitate the ink therein to maintain its mixture in a substantially homogeneous state.

As can be seen more clearly in FIG. 3, the container support frame 31 has a plurality of container attaching frames 31' each adapted to secure a container 10, having a different colored ink with the container 10 positioned in an inverted position, as clearly shown in these drawings. The cap 15 of each of the containers 10 is disposed on a support flange 31' with the flexible dispensing tube 16 disposed within a hole 35 provided therein, as shown in FIG. 5. A hand-operable dispensing valve mechanism 36 is hingedly secured on a vertical hinge pin connection 37, as shown in FIG. 5, whereby the mechanism 36 can be swung open to one side when the container 10 is installed so as to provide for the positioning of the flexible dispensing tube 16 through a guide bore 35 and straight down along the valve mechanism 36. The containers 10 are loaded in the apparatus 11 in an upright manner by positioning the frame 31 downward to position B as shown in FIG. 2. The cap 15 with the tube 16 is fitted on the containers and the tube is clamped in the valve mechanism 36.

Once a desired amount of containers 10 are secured in the apparatus the frame is again inverted to position A. The sealed top wall 24 of the nipples 20 is then punctured and the pressure connector caps 23 are secured whereby the pressure line 25 can be connected to all of the containers. However, the pressure pump (not shown) which connects to the pressure regulator 38 is not activated. As shown in FIG. 3, the container support frame 31 is also provided with a clamping bracket 39 to secure the frame 31 to the axially rotatable shaft 32.

With specific reference to FIGS. 3 to 5 there will now be described the construction of the dispensing valve mechanism 36. The valve mechanism 36 has a bracket 40 which is hingedly secured on the vertical hinge connection 37 and it swings from an engaged position as shown in FIG. 6B to a detach position, not shown, but obvious to a person skilled in the art. A securing bolt 41 maintains the bracket 40 in a closed position of use, as shown in FIG. 3. Once the bracket 40 is secured in its position of use, as shown in FIG. 3, the clamping head 42 which is secured at the end of a pivoting flange 43 is displaced by a finger operable knob 44 which is in threaded engagement with the bracket 40 in clamping engagement against an end portion 17 of the tube 16, as shown in FIG. 6B, whereby to seal off the tube. The tube 16 has a predetermined length whereby to fit into the valve mechanism. The open end of the tube does not contact any machine parts and accordingly the ink is discharged directly into the recipient 52 (see FIG. 1). Once the containers are displaced to position A the apparatus is now in a position to dispense ink from the containers 10. If the ink has a very low viscosity it may not be necessary to actuate the pressure pump.

As shown in FIG. 1, a scale 50, herein an electronic scale, is mounted on a slidable support rail 51 whereby the scale may be displaced along a straight axis and under a desired one of the containers 10. A recipient or vessel 52 is disposed on the scale 50 prior to its calibration. By displacing the scale on the rail, the vessel 52 is positioned under a desired container so that a desired weight quantity of ink color can be dispensed from the selected container in a regulated amount and without any contact with machine parts, as mentioned above.

In order to dispense a regulated amount of the ink, the user rotates the hand operable knob 44 whereby the clamping head 42 starts withdrawing from the tube end and ink starts discharging at a rate depending on the size of the opening. It is to be noted that the pressure in the container applied through the pressure line 25 is very low controlled pressure and usually below two pounds so that ink will not gush out of the flexible tube when the restricted throat starts opening and pressure will not build up in the containers. The pressure increases the flow rate of the ink and thereby saving operator time. As the ink within the vessel 32 approaches the desired weight amount, the operator will shut off the hand-operable knob and then open it very slightly to add very small quantities until the substantially exact desired weight quantity is displayed on the scale 50. The dispensing procedure permits the operator to agitate the containers 10 prior to the dispensing of a combination of ink color mixtures and this is done by displacing the lever 34 of the crank mechanism 33 as previously described. The hose 25 connected to the pressure regulator 38 is a flexible hose and will follow the containers during the reciprocating displacements thereof. FIG. 6A shows the valve in a fully retracted position with the flexible tube free end 16' being fully open to discharge the ink 12 from the container 10.

It is within the ambit of the present invention to cover any obvious modifications of the example of the preferred embodiments described herein, provided such modifications fall within the scope of the appended claims. For example, the containers could be mounted on a turret type support frame with the container being displaced over a stationary scale 50, much like the above-referred-to prior art. However, such structure would be more expensive to fabricate and it may be difficult and require expensive mechanism to agitate the containers in such a position. Furthermore, although the agitating means as herein described consists of a crank lever, it is obvious to a person skilled in the art that such agitation could be made by a motor drive connected by gears or belts to the axially rotatable shaft so that the agitation process can be effected automatically. However, the mechanical crank lever is much more economical. Furthermore, the dispensing valve could be automated but again this would make the apparatus more expensive and as pointed out hereinabove one of the features of this invention is its simplicity and economics, making it suitable for use by small printing establishments. With respect to the container 10, it is also conceivable that the nipple 20 could also be fitted with a one-way valve, but again this makes the container more expensive.

These are only examples of possible modifications to the apparatus and ink storage container of the present invention and it is not intended to be limiting. It is important, therefore, that the claims be regarded as including such modifications as well as others provided they do not depart from the spirit and scope of the present invention.

We claim:

1. An ink dispensing apparatus comprising a support frame for supporting a plurality of ink containers having an ink with a coloring agent, means to agitate said containers to maintain said ink in admixture with said coloring agent, a scale for weighing ink discharged from selected ones of said containers, and a dispensing valve mechanism associated with a respective one of said containers, said valve mechanism maintaining a flexible dispensing tube connected at a dispensing end of each said containers in a closed condition and capable of dispensing a desired weight quantity of said ink from said tube of selected ones of said containers.

2. An ink dispensing apparatus as claimed in claim 1 wherein there is further provided pressure control means to apply a predetermined pressure in said containers to assist in the discharge of ink therefrom.

3. An ink dispensing apparatus as claimed in claim 2 wherein said containers are each provided with a connector means in a bottom wall thereof to attach thereto a line connection of a pressure line of said pressure control means.

4. An ink dispensing apparatus as claimed in claim 2 wherein said dispensing valve mechanism is pivotally secured to said support frame to hinge said dispensing valve mechanism to an open position to permit said flexible dispensing tube to be positioned at said predetermined position.

5. An ink dispensing apparatus as claimed in claim 2 wherein said support frame is secured to an axially rotatable shaft supported on a main frame, said means to agitate imparting a predetermined axial rotation to said shaft to cause said plurality of containers to be displaced in a manner to impart thereto a movement capable of agitating said ink, said ink being a water base solvent and/or UV base ink having a predetermined coloring agent.

6. An ink dispensing apparatus as claimed in claim 5 wherein said means to agitate is a hand-operable crank having a handle connected to said axially rotatable shaft, said shaft being capable of inverting said containers secured to said support frame.

7. An ink dispensing apparatus as claimed in claim 5 wherein said scale is secured to a slidable support permitting said scale to be positioned under a desired one of said plurality of containers, said plurality of containers being secured to said support frame along a straight axis.

8. An ink dispensing apparatus as claimed in claim 3 wherein said connector means is a threaded nipple having a cap threadedly secured thereover, and a passage in said nipple, said pressure line being connected to said cap to admit pressurized air within each said containers through said passage in said nipple.

9. An ink dispensing apparatus as claimed in claim 6 wherein each said containers are provided with a dispensing mouth opening at a top end thereof, a cap having said flexible dispensing tube connected thereto for sealing said mouth opening and dispensing said ink.

10. An ink dispensing apparatus as claimed in claim 9 wherein said support frame is provided with a container attaching frame to secure each of said containers in an inverted position with said flexible dispensing tube disposed at a predetermined position with respect to said associated dispensing valve mechanism.

11. An ink dispensing apparatus as claimed in claim 10 wherein said dispensing valve mechanism is a hand-operable valve provided with a clamping head which is pressure biased against a dispensing end of said flexible dispensing tube with said sealing means having been removed from said free end of said tube by severing said tube immediately below said clamping head after said tube is pinched closed by said clamping head, said dispensing end portion of said flexible dispensing tube being pinched between an arresting member and said clamping head.

12. An ink dispensing apparatus as claimed in claim 11 wherein said dispensing valve mechanism has a finger operable element to progressively withdraw said clamping head from said dispensing end portion of said flexible dispensing tube to cause said ink to flow out of said dispensing end of said tube and into a receiving container positioned on said scale.

13. An ink dispensing apparatus as claimed in claim 12 wherein said finger operable element is a threaded shaft having a free end in abutment with a pivoted arm having said clamping head connected thereto, a finger engaging knob at an opposed end of said threaded shaft to impart axial rotation thereto, said shaft extending through a threaded bore provided in a fixed support member, said valve progressively varying the opening of a clamped portion of said flexible dispensing tube as said knob is rotated in a predetermined direction whereby to regulate the flow of said ink being discharged through said dispensing end of said flexible dispensing tube.

14. An ink container for the storage, transport and dispensing of an ink contained therein, said container having a mouth opening at a top end of a neck portion thereof, a cap secured to said mouth opening, a flexible dispensing tube sealingly secured to said cap, and a threaded nipple formed in a bottom wall of said container adapted to secure an air pressure line thereto, said threaded nipple having a sealed end adapted to be punctured to connect a pressurized air line thereto to apply pressure against ink contained in said container for creating a dispensing flow of said ink through said dispensing tube.

15. An ink container as claimed in claim 14 wherein said threaded nipple is formed in a recessed portion of said bottom wall.

16. An ink container as claimed in claim 14 wherein said container is a disposable container for containing a water-base solvent and/or UV base printing ink.

\* \* \* \* \*